(12) United States Patent
Mitchell et al.

(10) Patent No.: US 8,000,236 B2
(45) Date of Patent: *Aug. 16, 2011

(54) MEDIA PROXY ABLE TO DETECT BLOCKING

(75) Inventors: Julian Mitchell, Maidenhead (GB); Levay Louis, Ottawa (CA); Cedric Aoun, Boulogne (FR)

(73) Assignee: Nortel Networks Limited, Mississauga, ON (CA)

( * ) Notice: Subject to any disclaimer, the term of this patent is extended or adjusted under 35 U.S.C. 154(b) by 36 days.

This patent is subject to a terminal disclaimer.

(21) Appl. No.: 12/572,007

(22) Filed: Oct. 1, 2009

(65) Prior Publication Data
US 2010/0020792 A1 Jan. 28, 2010

Related U.S. Application Data

(63) Continuation of application No. 10/697,464, filed on Oct. 30, 2003.

(51) Int. Cl.
*H04L 12/26* (2006.01)
*H04L 12/56* (2006.01)
*H04L 12/66* (2006.01)
*G06F 15/173* (2006.01)

(52) U.S. Cl. ............. 370/230; 370/352; 370/395.2; 370/401; 709/225; 709/238

(58) Field of Classification Search ............. 370/230, 370/231, 352, 395.2, 401; 709/225, 238
See application file for complete search history.

(56) References Cited

U.S. PATENT DOCUMENTS
7,643,412 B1 * 1/2010 Mitchell et al. ............. 370/230
* cited by examiner

*Primary Examiner* — Harry S Hong
(74) *Attorney, Agent, or Firm* — Barnes & Thornburg LLP

(57) ABSTRACT

A media proxy receive a first message from a near end of a path of a communications session, and before receiving a corresponding message from a far end, the media proxy is arranged to detect a blocking situation where another device in the path is awaiting the first message before forwarding the corresponding message. Detecting such a blocking situation enables it to be overcome, and enables the communication session to proceed. The media proxy can send a probe message to discover if there is another media proxy along the path causing the blocking. This is useful where the only information about the far end is the media path which is in the call set up, e.g. IP address and port. Sending the probe message can be under the control of a call server.

11 Claims, 6 Drawing Sheets

CALL SET UP WITH CALL SERVER REQUESTING DETECTING OF BLOCKING

Fig 1 known arrangement using media proxies

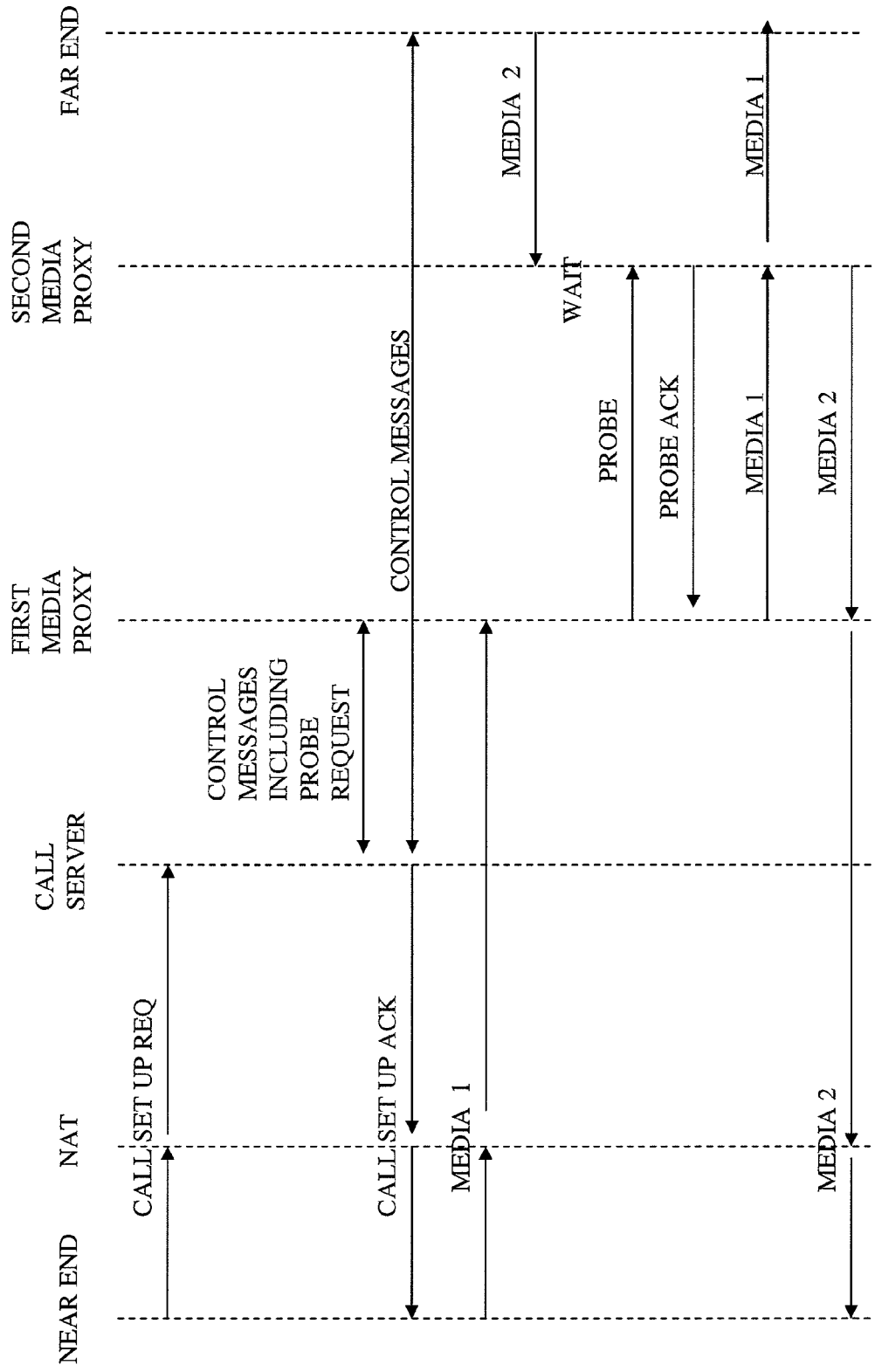
FIG 4 CALL SET UP WITH CALL SERVER REQUESTING DETECTING OF BLOCKING

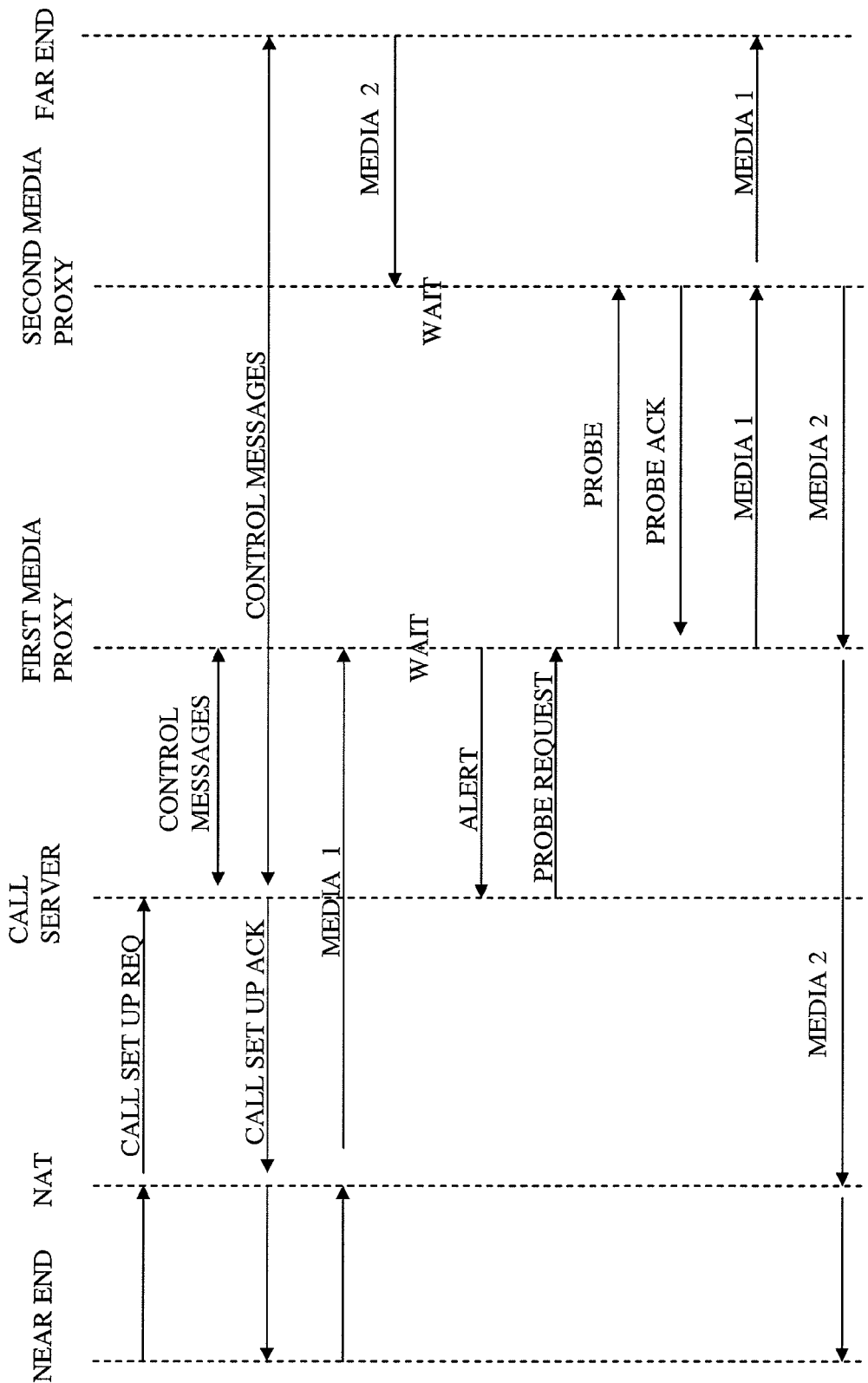
FIG 5 CALL SET UP, MEDIA PROXY ALERTS CALL SERVER ABOUT WAITING

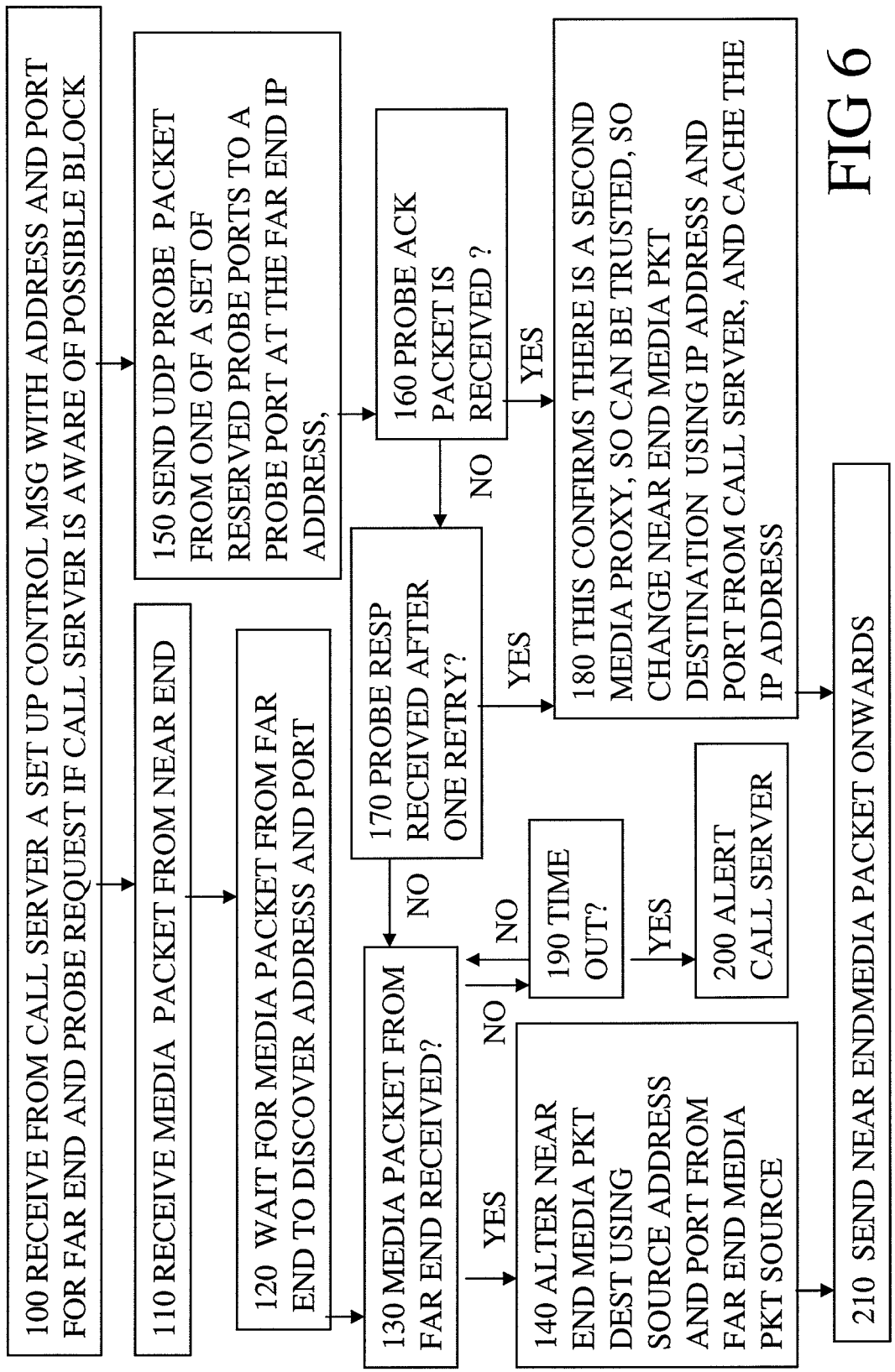

MEDIA PROXY ABLE TO DETECT BLOCKING

RELATED APPLICATION

This application is a continuation of U.S. patent application Ser. No. 10/697,464, filed Oct. 30, 2003, now U.S. Pat. No. 7,643,412.

FIELD OF THE INVENTION

This invention relates to media proxies, methods of using such media proxies and to methods of offering a communications service over such apparatus.

BACKGROUND TO THE INVENTION

It is known to provide media proxies to enable traffic to pass through NAT (network address translation) entities used in gateways to private networks such as LANs and VPNs (Virtual Private Networks). Traffic may be communication sessions in the form of data traffic or calls such as VoIP or video conferencing traffic. The NAT is needed to allow the devices in the private domain of an enterprise using the enterprise IP addresses (frequently using the reserved IP private address range 10.x.x.x) to establish communication with the devices in a carrier data network using its own IP addressing scheme, using either public or private IP addressing. A media gateway typically communicates with a call server to establish calls to a far end gateway. The call server selects one gateway to complete the call. Because of the NAT, the call server cannot simply provide the enterprise media gateway and the far end gateway with each others respective IP addresses and let the gateways send VoIP packets to each other as would normally be the case. The IP addresses for each gateway are corrupted by the NAT operation. To get around this problem, the call server can put in the call path specialized media proxies whose operation allows both gateways to communicate with each other. The call server instructs the enterprise media gateway and the far end gateway to send their packets to the media proxy. Essentially the media proxy patches together the two legs of the VoIP flow coming from the enterprise media gateway and from the far end gateway, as instructed by the call server by learning the translated source IP addresses and ports from VoIP packets sent to it. The learnt addresses and ports are then used as the destination addresses and ports for the return flow.

A media proxy is defined as a device which enables successful NAT traversal by providing a common target point in the external network for the originating and terminating endpoints of a communication session where one or both the originating and terminating endpoints are behind NAT. The media proxy is configured to relay the traffic stream from one end point to the other by manipulating the source and destination IP addresses of the traffic stream. This is also called a "twice NAT" function.

SUMMARY OF THE INVENTION

It is an object of the present invention to provide improved apparatus and methods. According to a first aspect of the present invention, there is provided a media proxy arranged to receive a first message from a near end of a path of a communications session, and before receiving a corresponding message from a far end, the media proxy is arranged to detect a blocking situation where another device in the path is awaiting the first message before forwarding the corresponding message.

Detecting this situation helps enable the blocking situation to be overcome, and enables the communication session to proceed. It is based on a recognition of how the normal operation of a media proxy can in some circumstances lead to such blocking, where the other device is also waiting for the first message. It could become commercially significant to be able to overcome such blocking to enable more reliable set up of multimedia communication sessions through media proxies.

An additional feature for a dependent claim is the media proxy being arranged to send a probe message to discover if there is another media proxy along the path.

This is useful where the only information about the far end is the media path which is in the call set up, e.g. IP address and port. An alternative detection of blocking is an indication from a far end call server that there is a media proxy or other device that includes a media proxy function such as an intelligent NAT.

Another additional feature is sending the probe message towards a predetermined port using an IP address indicated by a call server.

An alternative would be to send a message to the media port at the IP address indicated, but that is less favourable because it is on the media path, so would get passed to the far end, but is not valid data that the far end would expect. Another option is to send a valid media packet as a probe packet to the same port used for the media. The far end would send back its own media packets which could serve as an acknowledgement. This is less favourable than doing the probe process during call set up, and could cause problems if there are more than two media proxies in the path for example.

Another such additional feature is the media proxy being arranged to listen on a predetermined port for probe messages from other entities. This is usually easier to implement in the logic in the media proxy than the probe mechanism on separate port.

Another such additional feature is the media proxy being arranged to wait a predetermined time for the corresponding message before sending the probe message. This is useful to avoid unnecessary probe messages Another such additional feature is the media proxy being arranged to set up a communication session using a multimedia control protocol. Multimedia communications generally have more need to use a media proxy. Examples of multimedia control protocols include the H.323 standard and SIP for VoIP and video calls for example. These standards incorporate many other standards as is well known.

Another such additional feature is the media proxy being arranged to listen for a probe acknowledge message on the same port used for sending the probe message. This can make it easier to associate the acknowledge with the sent probe message. Such association could be done alternatively by coding or message number, but using the same port can reduce processing, and simplify logic.

Another such additional feature is the communication session being coupled through a NAT.

Another such additional feature is the communication session being coupled to a VPN.

Another such additional feature is the media proxy being arranged to send the first message onwards before receiving the corresponding message from the second end, if the probe message is acknowledged.

Another such additional feature is the media proxy being arranged to receive a probe request from a call server during set up. This can speed up the process if it means the proxy media does not have to wait before sending the probe message. An alternative is that the media proxy always sends a probe message. This could be faster and can keep the call server logic more simple. However this gives the call server no control, so many unnecessary probe messages will be sent, which can give potential security problems, since extra data is being sent out.

Another aspect of the invention is a media proxy arranged to receive a first message from a near end of a path of a communications session, and await a corresponding message from a far end before forwarding messages between the ends, the media proxy being arranged to send the first message onwards before receiving the corresponding message from the second end, if the media proxy is made aware of a blocking situation where another device in the path is awaiting the first message before forwarding the corresponding message.

Another aspect of the invention is a call server for use in setting up a communication session through a first media proxy, the call server being arranged to detect a blocking situation, where the media proxy has received a first message from a near end of a path of a communications session, and awaits a corresponding message from a far end before forwarding messages between the near and far ends, the call server being arranged to cause the first media proxy to send a probe message to determine if there is a second media proxy in the path of the communication session, and if so, to cause the media proxy to send the first message onwards before the arrival of the corresponding message from the far end.

An additional feature is the call server being arranged to send an IP address and port for the second media proxy to the first media proxy, to enable the first media proxy to send the first message onwards.

Another such additional feature is the call server being arranged to send a probe request to the media proxy in control messaging sent during call set up.

Another aspect of the invention provides a method of offering a communication service through the media proxy.

The advantages of the invention can enable improvements to be made in the system or network performance such as being more reliable or more flexible, having a greater capacity, or being more cost effective. Consequently data transmission services over the network can be enhanced, and the value of such services can increase. Such increased value over the life of the system, could prove far greater than the sales value of the equipment.

Another aspect of the invention provides a method of operating a call server and a first media proxy to set up a communication session, and to detect a blocking situation, where the media proxy has received a first message from a near end of a path of a communications session, and awaits a corresponding message from a far end before forwarding messages between the near and far ends, the method having the steps of using the call server to determine if there is a second media proxy in the path of the communication session, and if so, to use the media proxy to send the first message onwards before the arrival of the corresponding message from the far end.

Another aspect provides software for implementing the media proxy. This acknowledges that software can be a valuable, separately tradable commodity. It is intended to encompass software, which runs on or controls "dumb" or standard hardware, to carry out the desired functions, (and therefore the software essentially defines the functions of the media proxy and can therefore be termed a media proxy, even before it is combined with its standard hardware). For similar reasons, it is also intended to encompass software which "describes" or defines the configuration of hardware, such as HDL (hardware description language) software, as is used for designing silicon chips, or for configuring universal programmable chips, to carry out desired functions.

Any of the features can be combined with any of the aspects of the invention as would be apparent to those skilled in the art. Other advantages will be apparent to those skilled in the art.

BRIEF DESCRIPTION OF THE DRAWINGS

To show by way of example how the invention can be implemented, embodiments will now be described with reference to the figures in which:

FIG. 4 shows a sequence chart of an embodiment, FIG. 5 shows another sequence chart of an embodiment, and FIG. 6 shows actions of a media proxy according to an embodiment.

DETAILED DESCRIPTION OF PREFERRED EMBODIMENTS

Figure 1:
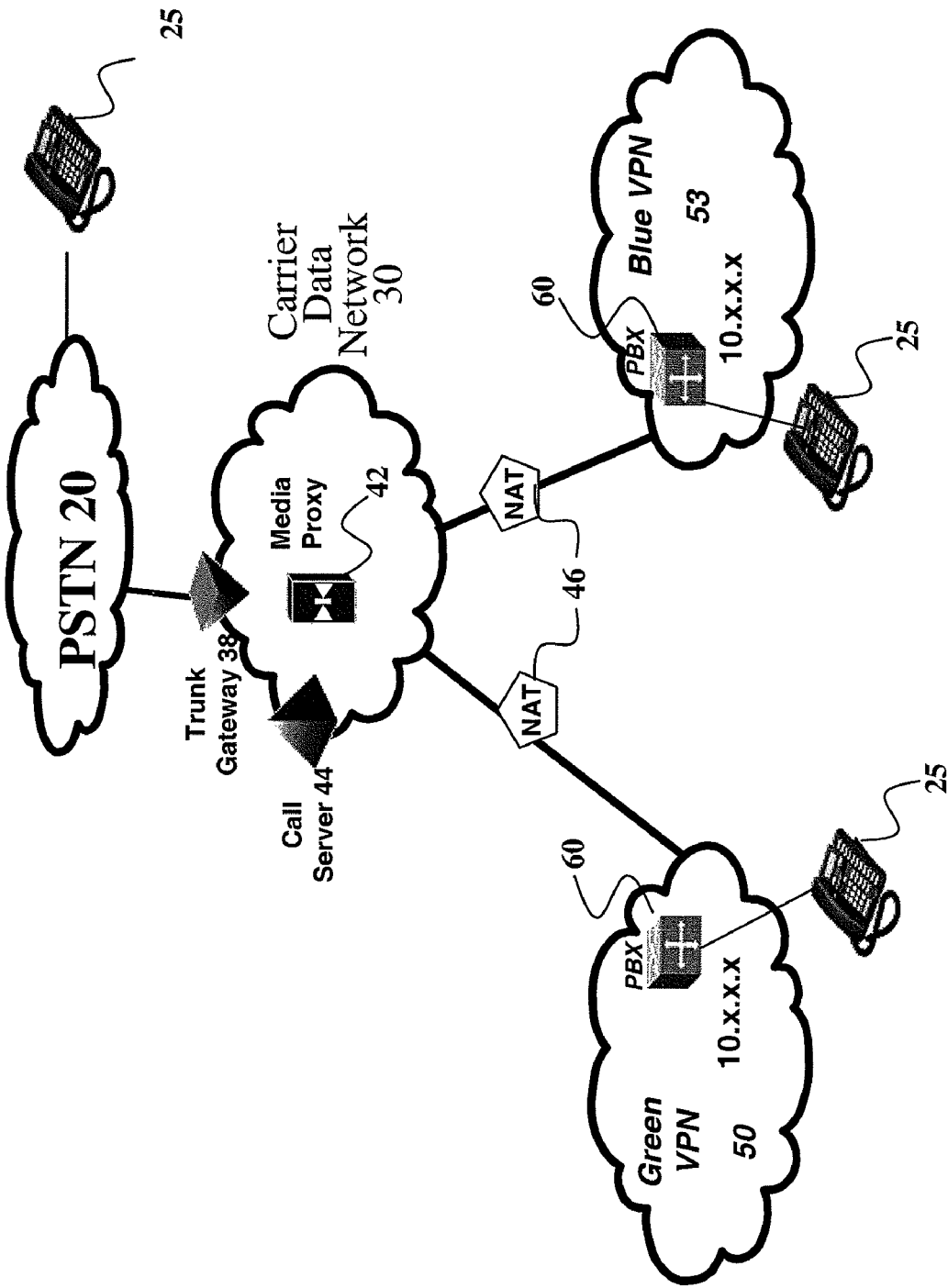
FIG. 1 shows a conventional arrangement of a network having a media proxy to couple calls to a PSTN.

FIG. 1, Conventional Network Arrangement

In FIG. 1, elements used in coupling VPNs to the PSTN 20 via media proxies are shown. Many VPNs can be provided by a carrier, over for example an IP network, and are coupled to make use of resources available in the data network 30 of the carrier. Two examples of parts of VPNs are shown, a "blue" VPN site 53, and a "green" VPN site 50. The green enterprise uses the private 10.x.x.x address range and similarly, the green VPN uses the overlapping private 10.x.x.x address range. In practice, each VPN would have multiple sites, only one is shown for each VPN. Each site has would have a router (not shown) for routing IP packets to and from computers and other devices on the site, to other sites and to the carrier data network. Each site has a PBX 60, for coupling local phones 25 to the VPN. NATs 46 are provided at the interface to the carrier data network. The carrier data network has a call server 44 for controlling calls, a trunk gateway 38 for converting traffic between packet format and the TDM format of trunks of the PSTN and ultimately reach phones 25 coupled to the PSTN. The carrier data network 27 also includes media proxies 42 to enable calls to be coupled through the NATs. The operation of such an arrangement will now be summarized.

Calls originate from the enterprise users connected to a telephony switch, typically a local PBX, and then go through a conversion to VoIP (Voice over IP) form, either via a media gateway inside the PBX itself or via an external media gateway. Instead of being routed over the public service telephone network (PSTN), the VoIP traffic is merged with the data traffic at the local VPN router. If the call is to another enterprise site connected in similar fashion to the VPN, then the VoIP traffic simply flows from site to site along with the data traffic. However, if the call is to be between a VPN site and a user on the PSTN, then the VoIP traffic needs to exit the VPN confines. This is typically done by interworking the enterprise VPN with the carrier data network where the equipment needed to interface to the PSTN reside. The interworking can be done a number of ways and may involve multiple interconnection points depending on the size of the network, but would in most cases involve going through a NAT. The NAT is needed to allow the devices in the enterprise using the enterprise IP addresses (frequently using the reserved IP private address range 10.x.x.x) to establish communication with the devices in the carrier data network using its own IP addressing scheme, using either public or private IP addressing.

The PBX 60 and associated media gateway communicate with the call server 44 to establish calls to the PSTN. The call server 44 selects one trunk gateway 38 to complete the call to the PSTN. Because of the NAT, the call server cannot simply provide the enterprise media gateway and the trunk gateway with each others respective IP addresses and let the gateways send VoIP packets to each other as would normally be the case. The IP addresses for each gateway are corrupted by the NAT operation. To get around this problem, the call server 44 can put in the call path specialized media proxies 42 whose operation allows both gateways to communicate with each other. The call server 42 instructs the enterprise media gateway and the trunk gateway to send their packets to the media proxy 42. Essentially the media proxy 42 patches together the VoIP flow coming from the enterprise media gateway and the trunk gateway, as instructed by the call server 44 by learning the translated IP addresses from VoIP packets sent to it. Multiple enterprise VPNs can be interconnected to the carrier data network in similar fashion and share the infrastructure needed to access the PSTN.

Figure 2:
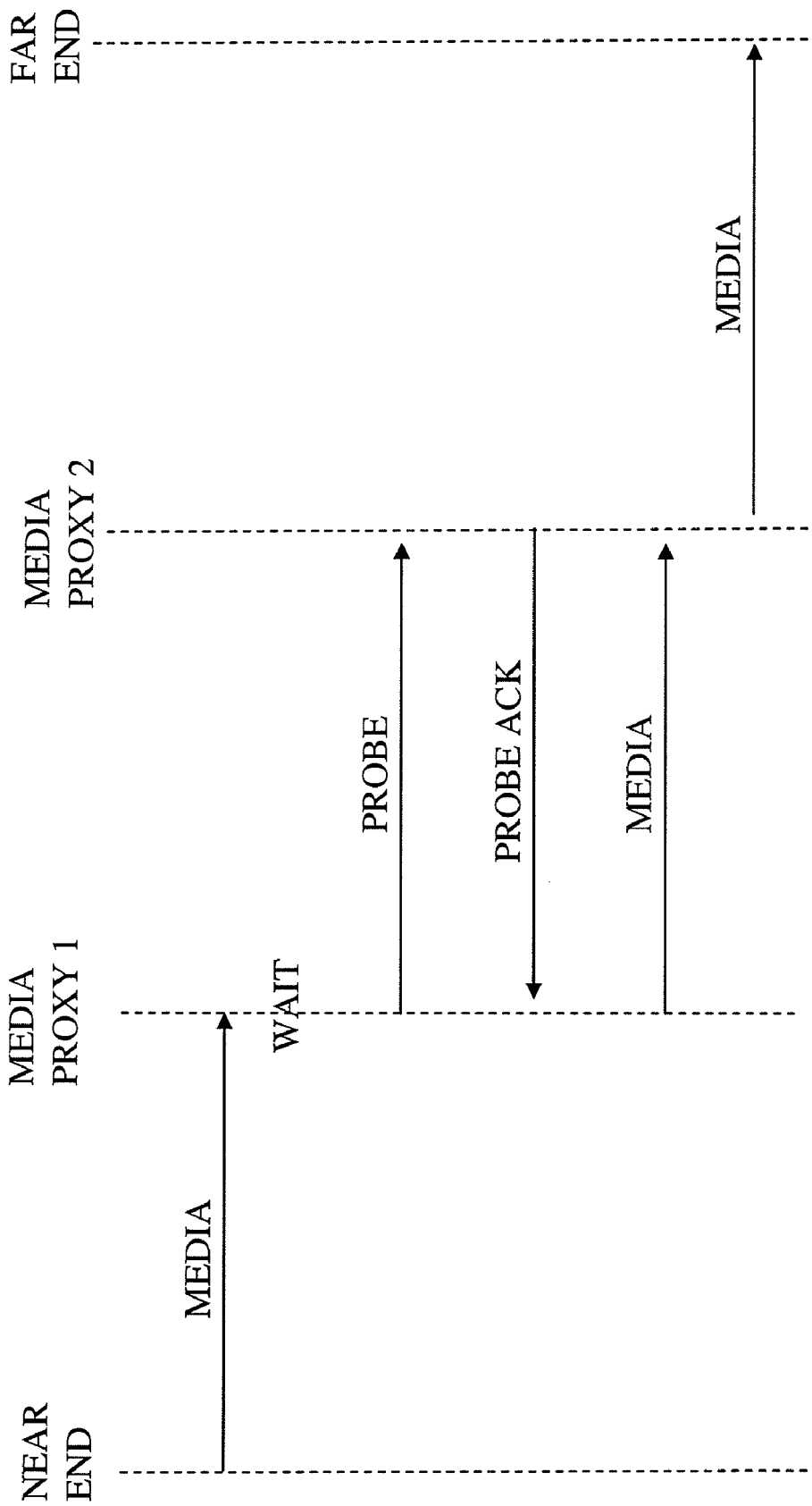
FIG. 2 shows a sequence chart of an embodiment.

FIG. 2, Sequence Chart of Blocking and how to Overcome it

FIG. 2 shows an embodiment in the form of a sequence chart. The first column shows actions of a near end of a communications session. The second and third columns show the actions of a first media proxy and a second media proxy. The fourth column shows the actions at the far end of the communications session. The near and far end could be gateways in the case of a VOIP call for example. Time is represented by the downward direction in the chart. A first step is the near end to send media packets or messages for example to the first media proxy. As discussed above, a media proxy will usually wait for a packet from the far end to do address and port discovery to determine the far end destination address. The first media proxy can determine that it should send a probe message or packet, either by waiting a predetermined length of time, or because it has been alerted in some other way that there could be a second media proxy in the path. The probe message is sent, towards a destination which could be deduced from the media message or packet, or indicated by a server. If there is another media proxy in the path, this media proxy is the second media proxy illustrated, and it returns a probe acknowledge message or packet. From this, the first media proxy deduces that there is a second media proxy in the path, and that it can therefore trust this destination address, and it sends the media message or packet onwards to the second media proxy. The second media proxy then forwards this on to the far end of the communication session.

Figure 3:
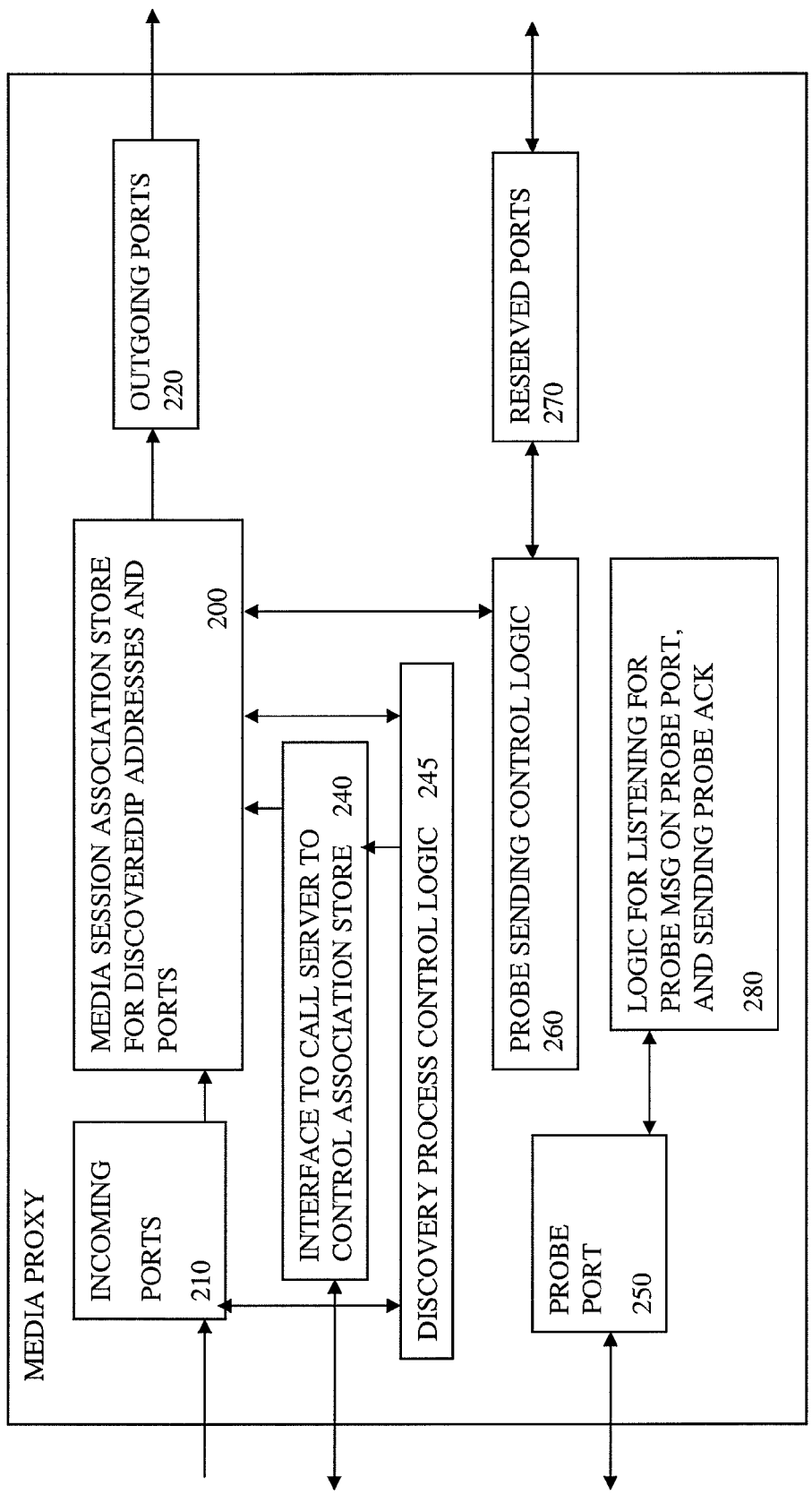
FIG. 3 shows an example of a media proxy according to an embodiment.

FIG. 3, Media Proxy

FIG. 3 shows some of the principal parts of a media proxy according to an embodiment of the invention, and suitable for use in the network of FIG. 1 and in the embodiment of FIG. 2. The media proxy includes a media session association store 200. This contains a mapping between a near end IP address and a far end IP address. This association store is accessed for each incoming message or packet to determine a destination to forward the message or packet. It is coupled to incoming port 210 and outgoing ports 220, and operates following conventional practice to discover the source address and port of incoming packets and store them for use as destination address and port for packets of the same call in the reverse direction. The association store is provisioned by an interface 240 to a call server to control the association store, and discovery process logic 245 is provided to control the discovery process.

The media proxy also includes a probe port 250 coupled to logic 280 for listening for probe messages or packets on a probe port and sending back a probe acknowledge message or packet. The media proxy also includes probe sending logic 260 for cycling reserved ports to enable probe messages relating to different calls to be sent from different reserved ports 270. The interface to the call server can also receive an IP address and port and a discover flag for affected terminations in the media proxy control messages. This can enable the media proxy to recognise that there is a potential blocking state where one media proxy is awaiting a second media proxy and vice versa.

The various functions of the media proxy and the call server can be implemented by software in conventional computer languages, for running on conventional hardware such as DSPs (Digital Signal Processors), general purpose microprocessors or application specific integrated circuits for example. These can be arranged with each of the parts implemented on cards coupled by a backplane, following conventional practice.

FIG. 4, Sequence Chart of Call Set Up with Call Server Requesting Probe

FIG. 4 shows a sequence chart showing actions of various entities in the network. Time is represented in the downward direction of the chart. The first column shows the actions of a near end of the communications session, the second column shows the actions of a NAT (network address translation entity), and the third column shows the actions of a call server. The fourth column represents the first media proxy, the fifth column represents the second media proxy, and the sixth column represents the far end of the communication session. The sequence starts with a call setup request sent from the near end through the NAT to the call server. Control messages are exchanged between the call server and the first media proxy, before the call server responds to the near end with a call setup acknowledge message or packet. The call server also sends control messages to the far end of the communication session.

Now the near end starts to send media packets (media 1) directly to the first media proxy, commonly UDP packets (User datagram protocol, a well known connectionless protocol layered on top of IP and defined in RFC 768). The far end will also send media packets (media 2) in the reverse direction to the second media proxy. Both media proxies would normally wait for packets from the other end in order to complete their usual IP address and port discovery process for the destinations of the respective media packets. This would normally cause blocking and no packets would flow between the media proxies. The call server has anticipated this blocking state since it has been made aware of the location of the far end, and can deduce it might be behind a NAT and need its own media proxy in the path. To confirm this, the call server nevertheless asks its own media proxy, the first media proxy to send a probe message. This request can be contained in the control messages, such as by setting a probe flag, so that the first media proxy need not wait in the blocking state.

An alternative is that the media proxy always sends a probe message, without looking for a probe flag in control messages from the call server. This could be faster and can keep the call server logic more simple. However this gives the call server no control, so many unnecessary probe messages will be sent, which can give potential security problems, since extra data is being sent out.

The first media proxy then sends the probe packet or message to the destination IP address and port indicated by the call server. This probe packet is sent from one of a set of ports on the first media proxy to a "well known port" at the provided destination IP address. By cycling port used for sending out the probe packet, probe packets for different calls can be differentiated, and the resulting probe acknowledge packets can be differentiated. There are other ways of achieving this, such as coding the packets or timing the sending for example. An alternative to using a special probe port is for the media proxy to create a dummy UDP packet to send out as the probe packet on the same port as used for the media.

The set of ports for sending probe packets and the well known port can be specified beforehand, and could be from those marked as reserved in the IANA list of registered ports, or registered with IANA if this procedure becomes standardised. The media proxy will then listen on the same port from which the packet was sent, for a probe acknowledge packet. If such a packet is received within a short time period, then the first media proxy deduces that the blocking is caused by a second media proxy. As this can then be trusted, then all future packets on this communication session can be sent to that address. Optionally, discovery can still be enabled on this port.

If no packet is received in a defined short time period, then probe packet can be resent from the same port. Normally this retry mechanism would only be repeated once. Each subsequent communication session or call, would send its probe packet from a different one of the reserved ports. This cycling of sending ports of the probe packet is one way of avoiding confusion between probe packets relating to different communication sessions. Other ways of avoiding such confusion can be envisaged.

As shown in FIG. 4, after the probe acknowledge packet is received by the first media proxy, the first media proxy can send the first media packets onwards to the second media proxy. These can be used by the second media proxy to discover a destination address and port for the second media packets in the reverse direction. These are sent onwards by the second media proxy to the first media proxy and from there to the near end via the NAT.

Each media proxy entity with a public address needs to be listening on the well known port on its public IP addresses for these probe packets. Whenever it receives such packets on its well known port, it will send a similar acknowledge packet back to the address and port from which it was sent.

FIG. 5, Sequence Chart of Alternative Call Set Up with Media Proxy Waiting and Alerting Call Server FIG. 5 shows a sequence chart similar to that of claim 4 showing actions of similar entities in the network. Time is represented in the downward direction of the chart. The differences to FIG. 4 will now be explained. The control message from the call server need not contain any probe request flag, and the media proxy may or may not look for one. If a blocking situation arises, both media proxies wait. After a predetermined wait time, the first media proxy alerts the call server, and at that point the call server sends a probe request to the first media proxy. The probe message is then sent out by the first media proxy and the process continues as in FIG. 4. The result is a longer wait time, but the call server can be simpler if it need not be arranged to anticipate such blocking states, and if it can use conventional control messages without change to include probe requests.

FIG. 6, Media Proxy Actions

FIG. 6 shows a series of actions of the first media proxy, according to an embodiment of the invention. At step 100 the media proxy receives from the call server a control message with an address and port to use as the destination for the media packets from the near end. This control message has the probe flag set if the call server is aware of a possible blocking state. This triggers two parallel lines of actions. At step 110 media packets are received from the near end. At step 120 the proxy waits for a packet from the far end to discover the address and port of the destination for use in forwarding the packets from the near end. At step 130 the media proxy waits for a packet to be received from the far end. In parallel, at step 150, the media proxy sends a probe packet to a predetermined well known probe port at the destination IP address indicated by the call server. It waits at step 160 for a probe acknowledge packet to be received at the same port. If none is received after a given time, one retry is carried out at step 170, and an acknowledge is awaited.

At step 180, if a response packet is received, the first media proxy deduces that there is a second media proxy in the communications path. This is a trusted entity, and so the first media proxy is able to send onwards the media packet from the near end at step 210 towards the far end, using the IP address and port indicated by the call server in the control message. At step 180, the first media proxy caches the IP address so that no probe packet need be sent next time there is a blocking situation with the same IP address. If no probe response is received after the retry and a given time, control returns to step 130, awaiting a media packet from the far end. If none is received after a given time at step 190, at step 200, the media proxy alerts the call server, and lets it control what happens. If a media packet is received from the far end, at step 140 the media proxy uses this to discover the source IP address and port for use as the destination IP address and port for the near end media packets, and the near end media packets can be forwarded at step 210.

Applications

As media proxies can be used to allow multi-media calls over IP into or out of private LANs. These can involve communication sessions using multi-media transmission standards such as H.323 and SIP (session initiation protocol). In such cases, the NAT function used to maintain the privacy of IP addresses in the LAN, or VPN (virtual private network). In such cases, an end of the communication session may be a gateway for providing a protocol conversion service between H.323 terminals and other terminals such as the PSTN (public switched telephone networks), or gateways allowing access to terminals on the public internet. The use of the media proxy effectively enables the communication session to be handled in two separate legs, one of which passes through the NAT. A common situation where blocking might arise is in a multi-media call from one VPN to another VPN, each having their own NAT, and media proxy.

CONCLUDING REMARKS

As has been described above, a media proxy receive a first message from a near end of a path of a communications session, and before receiving a corresponding message from a far end, the media proxy is arranged to detect a blocking situation where another device in the path is awaiting the first message before forwarding the corresponding message. Detecting such a blocking situation enables it to be overcome, and enables the communication session to proceed. The media proxy can send a probe message to discover if there is another media proxy along the path causing the blocking.

This is useful where the only information about the far end is the media path which is in the call set up, e.g. IP address and port. Sending the probe message can be under the control of a call server.

Other variations will be apparent to those skilled in the art, having corresponding advantages to those set out above, within the scope of the claims.

The invention claimed is:

1. Media proxy apparatus arranged to receive via an incoming port a first message comprising media packets from a first media gateway located near a first end of a communications path for forwarding via an outgoing port to a second media gateway located near a second end of the communications path, the media proxy apparatus being arranged to detect a blocking situation where another media proxy apparatus in the communications path is awaiting receipt of the first message in order to perform address discovery to determine an address of the first media gateway to enable it to forward to said first media gateway a second message comprising media packets from the second media gateway, said first media gateway normally requiring receipt of the second message in order to perform address discovery to determine an address of the second media gateway to enable it to forward to said second media gateway said first message, the media proxy apparatus being arranged to detect said blocking situation by sending a probe message via a probe port along said communications path towards the second media gateway end of the path and receiving a probe message acknowledge message from said another media proxy thereby enabling the media proxy apparatus to deduce that the another media proxy apparatus is in the communications path causing the blocking situation, said media proxy apparatus being arranged to forward the first message to the second media proxy apparatus in response to receiving said probe message acknowledge message thereby resolving the blocking situation.

2. The media proxy apparatus of claim 1, arranged to send the probe message from the probe port of said media proxy apparatus using an IP address indicated by a call server.

3. The media proxy apparatus of claim 2, arranged to listen on a predetermined port for probe messages from other media proxies.

4. The media proxy apparatus of claim 1, arranged to wait a predetermined time for the second message before sending the probe message.

5. The media proxy apparatus of claim 1, arranged to set up a communication session using a multimedia control protocol.

6. The media proxy apparatus of claim 2 arranged to listen for a probe acknowledge message from another media proxy apparatus on the same port used for sending the probe message.

7. The media proxy apparatus of claim 1, the communications path including a network address translator (NAT).

8. The media proxy apparatus of claim 7, the communications path being coupled to a VPN.

9. The media proxy apparatus of claim 1, being arranged to send the first message to the second media gateway before receiving the second message from the second media gateway, if the probe message is acknowledged.

10. The media proxy apparatus of claim 1, arranged to receive a probe request from a call server during call set up.

11. A media proxy apparatus arranged to receive a first message via an incoming port comprising media packets from a first media gateway located near a first end of a communications path for forwarding to a second media gateway located near a second end of the communications path, and to await a second message comprising media packets from said second media gateway, the media proxy apparatus being arranged to send the first message via an outgoing port to another media proxy apparatus before receiving the second message from the second media gateway, if the media proxy apparatus is made aware of a blocking situation where the another media proxy apparatus in the communications path is awaiting receipt of the first message in order to perform address discovery to determine an address of the first media gateway to enable it to forward to said first media gateway said second message.

* * * * *